United States Patent
Sharma

(10) Patent No.: US 8,533,079 B2
(45) Date of Patent: Sep. 10, 2013

(54) INTEGRATED SYSTEMS FOR ELECTRONIC BILL PRESENTMENT AND PAYMENT

(75) Inventor: Dushyant Sharma, Richmond Hill (CA)

(73) Assignee: Metavante Corporation, Jacksonville, FL (US)

( * ) Notice: Subject to any disclaimer, the term of this patent is extended or adjusted under 35 U.S.C. 154(b) by 0 days.

(21) Appl. No.: 13/107,766

(22) Filed: May 13, 2011

(65) Prior Publication Data

US 2011/0276450 A1    Nov. 10, 2011

Related U.S. Application Data

(63) Continuation of application No. 09/751,265, filed on Dec. 29, 2000, now Pat. No. 7,945,491.

(51) Int. Cl.
*G06Q 40/00* (2012.01)

(52) U.S. Cl.
USPC .................................. 705/34; 705/40

(58) Field of Classification Search
USPC ........................................................ 705/40
See application file for complete search history.

(56) References Cited

U.S. PATENT DOCUMENTS

| | | | | |
|---|---|---|---|---|
| 6,421,067 | B1 * | 7/2002 | Kamen et al. | 715/719 |
| 6,493,685 | B1 * | 12/2002 | Ensel et al. | 705/40 |
| 6,578,015 | B1 * | 6/2003 | Haseltine et al. | 705/34 |
| 2005/0192896 | A1 * | 9/2005 | Hutchison et al. | 705/40 |

* cited by examiner

*Primary Examiner* — Olabode Akintola
(74) *Attorney, Agent, or Firm* — Finnegan, Henderson, Farabow, Garrett & Dunner, LLP

(57) ABSTRACT

The present invention relates generally to electronic commerce, and more particularly to methods and systems for integrating electronic bill presentment and payment among billers, consumers, banks and other financial institutions, electronic payment facilitators, and web portals and other spaces able to support an interface for presentment and/or payment of bills.

23 Claims, 33 Drawing Sheets

Bill Box - Customer View

Welcome to go2net Billbox: Your highly secure Vault for billing

I'm a New User

Go2Net Personal — First Step is to create a user account. If you have already done this proceed to second step

Create A BillBox — Second step is to create a Bill Box!

I'm already registered for a BillBox!

BillBox ID: 234AS234
Login ID: demo
Password:

☐ Remember my ID & Password ( What's this?)

[ Sign in ]

Trouble signing in?
Get help signing in here.

Send Your Bills To
- Any Customer
- Any Where
- Any Time
- Any Way

Using secure Billbox Vault™

Get Your Bills From
- Any Device
- Any application
- Any place
- Any time

Using secure Billbox Vault™

Traded on NASDAQ: GNET Copyright © Go2Net, Inc. 1996-1999  Terms of use

Fig. 5

Welcome to go2net Billbox: Your highly secure Vault for billing

Note: BillBox provides a very secure Vault to store all your information. There is no open data. All data is encrypted before it is stored. The encryption key is defined by you and is known only to you.

To access your billbox, you need

- Billbox id : Billbox id is an unique identification that is provided to each Billbox user.
- Userid/Password : Unique combination known to only you.
- Encryption Key: Defined by you. No data can be accessed without this key, even if you enter the bill-box using valid userid/password.

Traded on NASDAQ. GNET Copyright © Go2Net, Inc. 1996-1999  Terms of use

Fig. 6

| | Go2Net stocks metaspy games shopping auctions email billbox | | | Go2Net Personal |
|---|---|---|---|---| bill box   my bills | are you a biller? | logout | help

INBOX
OUTBOX
COMPANY LIST
PAY ACCOUNTS
PREFERENCES
CONTACT US

My inbox

| select | Biller name | Amount due | Date Due | Status | Bill |
|---|---|---|---|---|---|
| ☐ | Microcell Solutions | 40.07 | 12/01/99 | Unpaid | VIEW |
| ☐ | Firstline visa | 615.51 | 12/01/99 | Unpaid | VIEW |
| ☐ | ETR | 247.34 | 12/01/99 | Sched | |

Pay selected bills

Fig. 7 bill box

Go2Net stocks metaspy games shopping auctions email billbox | Go2Net Personal

[ ... ] [are you a biller?] [logout] [help]

Company list

| Company | Scheduled | |
|---|---|---|
| MICROCELL SOLUTIONS 0132****2333 | yes | Modify / Delete |
| FIRSTLINE VISA 4103 **** **** 1111 | no | Modify / Delete |
| ETR 212****7589 | no | Modify / Delete |
| AMERICAN EXPRESS 3133 **** 3586 | no | Modify / Delete |

Add a company

INBOX
OUTBOX
COMPANY LIST
PAY ACCOUNTS
PREFERENCES
CONTACT US

Fig. 9 go2net stocks metaspy games shopping auctions email billbox  Go2Net Personal bill box    [    ]  [are you a biller?]  [logout]  [help]

INBOX
OUTBOX
COMPANY LIST
PAY ACCOUNTS
PREFERENCES
CONTACT US

Add a company

Please enter the required informatioin about your biller. After completing this information, click add company.

Select a category : [Utility ▼]
Company name : [ABC utility ▼]
Delivery method : [CheckFree ▼]
Account number : [4200 5748 9856 024]
Expiry date : [11/02] mm/yy ☐ Enable recurring payment schedule

[ Add ]   [ Cancel ]

Fig. 10

| go2Net | stocks | metaspy | games | shopping | auctions | email | billbox | Go2Net Personal | bill box  [ ] [are you a biller?] [logout] [he o]

INBOX
OUTBOX
COMPANY LIST
PAY ACCOUNTS
PREFERENCES
CONTACT US

My outbox

| select | Biller name | Amount due | Date Due | Status | Bill |
|---|---|---|---|---|---|
| ☑ | Comtel Telecom Solutions | 57.75 | 11/01/99 | Paid | VIEW |
| ☑ | Hydro Utility visa | 75.51 | 11/02/99 | Paid | VIEW |
| ☐ | Acro Consultants | 233.34 | 11/04/99 | Paid | |

Delete

Fig. 11

| | stocks | metaspy | games | shopping | auctions | email | billbox | Go2Net Personal | bill box    my bills   [are you a client]   logout   help

INBOX
OUTBOX
COMPANY LIST
PAY ACCOUNTS
PREFERENCES
CONTACT US

Pay Accounts

⦿ New Credit Card
○ New Debit Account

Account List

| | ACCOUNT TYPE | ACCOUNT NUMBER | ACCOUNT NAME |
|---|---|---|---|
| ○ | CHEQUING | 35*45 | sdfgs |
| ○ | VISA | 41111*****111111 | dddddddd |

Credit Card: [Select credit card t]
Card Number: 
Expiration Date: MM/YY
Name on Card:

ADD

Fig. 12

Password Change

Passwords must be between 6 and 16 characters, at least one of which is numeric (0-9), and at least one of which is a letter (a-z or A-Z). Special characters (&, @ or ~) are acceptable, but not spaces.

*Current Password:
*New Password:
*Re-Type New Password:

Submit    Clear

Fig. 14

| go2net | stocks | metaspy | games | shopping | auctions | email | billbox | Go2Net Personal | bill box  | my bills | are you a biller? | logout | help |

- INBOX
- OUTBOX
- COMPANY LIST
- PAY ACCOUNTS
- PREFERENCES
- CONTACT US

*Fields marked with an asterisk (*) must be entered.*
PERSONAL INFORMATION

Please make the necessary changes.

* First Name: JOHNNY
Middle Name: Q
Last Name: SAMPLE324
*User ID: 000324
Password:
Retype Password:
* Email:
* Street Address: 703 23RD ST S
* City: ARLINGTON
* State: VA
*ZIP Code: 22202-2419
*Day Phone: (555-555-5555)
Evening Phone: (555-555-5555)

SUBMIT CHANGES

| go2Net | stocks | metaspy | games | shopping | auctions | email | billbox | Go2Net Personal | bill box   [my bills] [are you a biller?] [logout] [heo]

- INBOX
- OUTBOX
- COMPANY LIST
- PAY ACCOUNTS
- PREFERENCES
- CONTACT US

Contact Us

If you have questions about the Billbox's service, check out our Frequently Asked Questions. Answers to most common questions are immediately available online.

To contact Billbox using email, type your message in the area below and click the Send Email button. You can also speak with a Billbox Service Representative by calling our toll free number: 1-877-BILLS4U (1-877-245-5748).

1. Enter your email address here: [      ]

2. Type your message or question below:
[                                                    ]

3. Click here: [Send Email] to submit this to Billbox Customer Service.

4. Please wait for your confirmation message.

Fig. 18

Sign up as a biller!

If you send bills, now is the time to register. Soon you will be able to enjoy the savings of sending your bills electronically. No more hassles of folding and mailing paper bills. Fill out the form below, and when you are authenticated, we will contact you by email.

Company name : Derivion
Company address : 905 Paces Ferry Road
Company city : Atlanta
Company state : Georgia
Company zip : 30326
Company e-mail : info@derivion.com Merchant id : MID-03261973

[Sign up] [Reset]

Fig. 19

| Go2Net | stocks | motaspy | games | shopping | auctions | email | billbox | Go2Net Personal | bill box  [my bills] [are you a biller?] [logout] [rep]

- BILL TEMPLATE
- INVOICE
- REPORTS
- IMPORT BILLS
- BILL PREVIEW
- CUSTOMER LIST
- SEND MAIL

Invoice

Here you can send a one time only invoice. Use this as an alternative to creating a template for one time transactions. Enter your information below and simply click send when you are finished.

Fields marked with an * must be completed.

* Biller's name : [Doe Lawn Services]

Amount Options : [Amount Due ▼]

* Recipients : [Individual ▼]

* Description of service/item: [Lawn mowing]

[Continue] [Reset]

Fig. 23 billbox my bills | [are you a biller?] | logout | help

BILL TEMPLATE
INVOICE
REPORTS
IMPORT BILLS
BILL PREVIEW
CUSTOMER LIST
SEND MAIL

Invoice (Step No 2)

Fields marked with an * must be completed.

* Name : Jane Smith
* Billbox Id : 234234
* Amount due : 50
  Minimum amount due :
* Date due : Nov 30/99

Send Now

Send Later

| go2net | stocks | metaspy | games | shopping | auctions | email | billbox | Go2Net Personal | bill box

[ my bills ] [ are you a biller? ] [ logout ] [ help ]

- BILL TEMPLATE
- INVOICE
- REPORTS
- IMPORT BILLS
- BILL PREVIEW
- CUSTOMER LIST
- SEND MAIL

Bill quality assurance

- Choose the bill you would like to preview.
- When you are satisfied with these bills, click 'Send the bills' to release them to your clients.

Account # [245-222-6523 ▼] [View] [Edit Bills] [Send the bills]

---

John Smith
15 Main Street.
Toledo, OH 43232

Statement Date: Nov 2, 1999
Due date: Nov 26, 199:
Account number: 245-222-6523
Invoice number: 021453

Bill Summary

Billing Period: 2/10 to 2/11

Amount of Previous Bill                                    $97.72

Payment Received on October 18, 1999.    Thank You         $97.72

Total Current Charge due by Nov 26, 199:                   $109.69

---

[ Done ]

Fig. 30 bill box

Go2Net stocks metaspy games shopping auctions email billbox Go2Net Personal my bills | are you a biller? | logout | help

- BILL TEMPLATE
- INVOICE
- REPORTS
- IMPORT BILLS
- BILL PREVIEW
- CUSTOMER LIST
- SEND MAIL

Customer list

Here you can add, modify or delete your customer accounts.

| Add a customer | Account Organizer |

| Account | BillBox id | | |
|---|---|---|---|
| Steven Ritchie 257895 | 115425 | Modify | Delete |
| Marco Sousa 254865 | 335263 | Modify | Delete |
| Dave Moulton 558423 | 985465 | Modify | Delete |
| Sean Vanzante 025463 | 089455 | Modify | Delete |
| Scott Dyment 201256 | 054879 | Modify | Delete |
| Tony Casciaro 959685 | 356585 | Modify | Delete |

INTEGRATED SYSTEMS FOR ELECTRONIC BILL PRESENTMENT AND PAYMENT

This is a continuation of application Ser. No. 09/751,265, filed Dec. 29, 2000 now U.S. Pat. No. 7,945,491, which is incorporated herein by reference.

The present invention relates generally to electronic commerce, and more particularly to methods and systems for integrating electronic bill presentment and payment among billers, consumers, banks and other financial institutions, electronic payment facilitators, and web portals and other spaces able to support an interface for presentment and/or payment of bills.

BACKGROUND OF THE INVENTION

Billing consumers for goods and services has always been a necessary exercise and transaction cost of engaging in credit-based commerce. Traditionally, businesses bill consumers for goods and services by generating and mailing paper bills or invoices. There are many obvious business concerns relative to paper-based billing. Companies utilizing paper-based billing do so at a substantial cost. For example, a company with 100,000 accounts which are billed on a monthly basis may spend over two million dollars a year in paper-based billing expenses. Much of this expense stems from the cost of materials, postage, and manual processing of the paper bills, inserts, and envelopes.

Other significant logistical and business concerns detract from the paper-based billing option. The time delay associated with sending bills and receiving payments via conventional mailing deprive companies of the time value of money and therefore create additional transactional costs. This time delay is particularly troublesome to small billers and non-recurrent billers who tend to rely more heavily on cash flow.

Paper-based billing can also deprive billers of an opportunity to build brand. Although many paper billers include various types of marketing inserts with their bills in an attempt to use the billing activity as an additional opportunity to make favorable brand impressions on the consumer, those materials cannot be targeted as effectively as in an interactive session. For instance, billers do not have significant realistic control over the circumstances under which, or whether, a consumer views particular inserts. Indeed, studies have shown that many consumers disregard such inserts altogether.

The development of the Internet creates new opportunities to transact business electronically, including to conduct the billing presentment and payment process electronically, in an on-line way or otherwise. Some refer to various aspects of the electronic billing process as electronic bill presentment and payment (EBPP). Instead of mailing paper bills, EBPP enables businesses to publish, distribute and/or present bills electronically on web pages. Instead of writing checks and applying stamps, consumers have the opportunity to pay bills by an electronic credit card charge or direct bank draft. The biller benefits by avoiding the cost of generating and mailing paper bills, and by avoiding the payment float occasioned by two-way mail delay and other delays in paper-based remittance. The consumer benefits with the added convenience of conducting transactions online, and the opportunity to pay many or all bills on one site or in one virtual space.

In practice, however, there are significant concerns with conventional approaches to EBPP. For example, in one common approach to EBPP, which is often referred to as the custom development method, billers create a proprietary electronic billing system and link it to a third-party for payment processing. Because custom development is mostly an internal EBPP solution, it gives billers the advantage of tight control over the billing system. However, this type of solution is very costly. Not only is it a technology risk because billers lose the flexibility to adapt to other EBPP standards, but it requires a substantial amount of manpower and infrastructure. Furthermore, such systems innately discourage consumer use or popularity, since the consumer is required to log onto and initiate a session on a separate site for each different bill the consumer wishes to pay.

A second common EBPP approach, which is referred to as the consolidator approach, presents its own set of problems. This method of enabling EBPP trades control of the billing interface and branding opportunity for a reduction in cost, risk, and internal staffing by outsourcing the EBPP to a third party consolidator. Here, the electronic payment processor takes on a lock box function of holding and moving cash during billing and payment. The payment processor performs an aggregation function by presenting multiple billers' statements at a single, consolidating web site. Not only does interposition of the consolidator and its interface between billers and consumers interrupt any existing relationship, but it also precludes exploitation of new biller opportunities to interact with consumers.

In addition to the problems already mentioned, existing EBPP enabling methods have various other disadvantages. For example, they remain an expensive option for most billers who lack sufficient economies of scale necessary to overcome the high fixed cost of implementation. These EBPP methods, which primarily focus on reducing biller costs, also often fail to address the issue of consumer convenience adequately, much less to provide effective incentives for consumer adoption.

Furthermore, conventional EBPP approaches, which seek to implement EBPP on portal interfaces, often require redundant resources supported by multiple entities and consequently waste processing and transport resources. For example, using existing EBPP methods, if a consumer desires to pay AT&T bills electronically at a website such as Yahoo.com., the following occurs. First, the consumer requests that Yahoo.com receive the AT&T bill and send it to the consumer. Then, assuming AT&T partners with an electronic payment facilitator such as CheckFree, Yahoo.com makes a request to CheckFree. Finally, CheckFree initiates the request to AT&T. Because each of these entities are independent, each requires its own resident database and other support functionality. Such conventional portal-supported EBPP approaches provide significant opportunity for improvement.

SUMMARY OF THE INVENTION

The present invention provides fully integrated, end-to-end electronic bill presentment and payment systems. Such systems support integrated EBPP access and functionality for billers, consumers, banks, other financial institutions, and other electronic payment facilitators, any or all of which can be transacted at a web portal, web site or other interface or virtual space ("Portal Interface"). Such systems can support such activities at multiple portals, so that consumers and others have the choice of paying bills and accomplishing other EBPP transactions in whatever virtual space or at whatever site they desire. The systems provide consumers, billers and others the ability to self-enable EBPP by interacting with the portal interface such as via a series of web pages. Such systems of the present invention can control all interactions between billers and consumers from the portal interface. In addition, the systems can seamlessly orchestrate all other transactions with payment facilitators and banks. Therefore, all EBPP functionality and processes can be controlled by systems and processes according to the present invention.

The Portal Interface controlled by systems of the present invention provides individual consumers with a secure personalized electronic bill portfolio where they can schedule, view, and pay their electronic bills. The Portal Interface controlled by such systems also enables billers to create consumer accounts and electronically publish their bills on a personalized electronic bill portfolio for viewing and payment. The systems can provide all bill processing, payment processing, consumer and biller data storage, and arrange all external billing transactions.

BRIEF DESCRIPTION OF THE DRAWINGS

FIG. 5 is a sign in screenface of a portal interface generated by a preferred embodiment of systems of the present invention.

FIG. 6 is a help screenface of a portal interface generated by a preferred embodiment of systems of the present invention.

FIG. 7 is an inbox screenface of a portal interface generated by a preferred embodiment of systems of the present invention.

FIG. 9 is a company list screenface of a portal interface generated by a preferred embodiment of systems of the present invention.

FIG. 10 is an add a company screenface of a portal interface generated by a preferred embodiment of systems of the present invention.

FIG. 11 is a my outbox screenface of a portal interface generated by a preferred embodiment of systems of the present invention.

FIG. 12 is a pay accounts screenface of a portal interface generated by a preferred embodiment of systems of the present invention.

FIG. 14 is a change password screenface linked off the preferences screenface of a portal interface generated by a preferred embodiment of systems of the present invention.

FIG. 15 is a personal information screenface linked off the preferences screenface of a portal interface generated by a preferred embodiment of systems of the present invention.

FIG. 16 is payment reminder creation screenface linked off the preferences screenface of a portal interface generated by a preferred embodiment of systems of the present invention.

FIG. 17 is a generic create a reminder screenface linked off the preferences screenface of a portal interface generated by a preferred embodiment of systems of the present invention.

FIG. 18 is a contact customer service screenface linked off the preferences screenface of a portal interface generated by a preferred embodiment of systems of the present invention.

FIG. 19 is a biller signup screenface of a portal interface generated by a preferred embodiment of systems of the present invention.

FIG. 23 is an invoice creation step 1 screenface of a portal interface generated by a preferred embodiment of systems of the present invention.

FIG. 24 is an invoice creation step 2 screenface of a portal interface generated by a preferred embodiment of systems of the present invention.

FIG. 26 is a report builder screenface of a portal interface generated by a preferred embodiment of systems of the present invention.

FIG. 29 is bill quality assurance screenface of a portal interface generated by a preferred embodiment of systems of the present invention.

FIG. 30 is a second bill quality assurance screenface of a portal interface generated by a preferred embodiment of systems of the present invention.

FIG. 31 is a third bill quality assurance screenface of a portal interface generated by a preferred embodiment of systems of the present invention.

FIG. 32 is an add an account screenface of a portal interface generated by a preferred embodiment of systems of the present invention.

DETAILED DESCRIPTION OF THE INVENTION

A. General Overview of System

Figure 1:
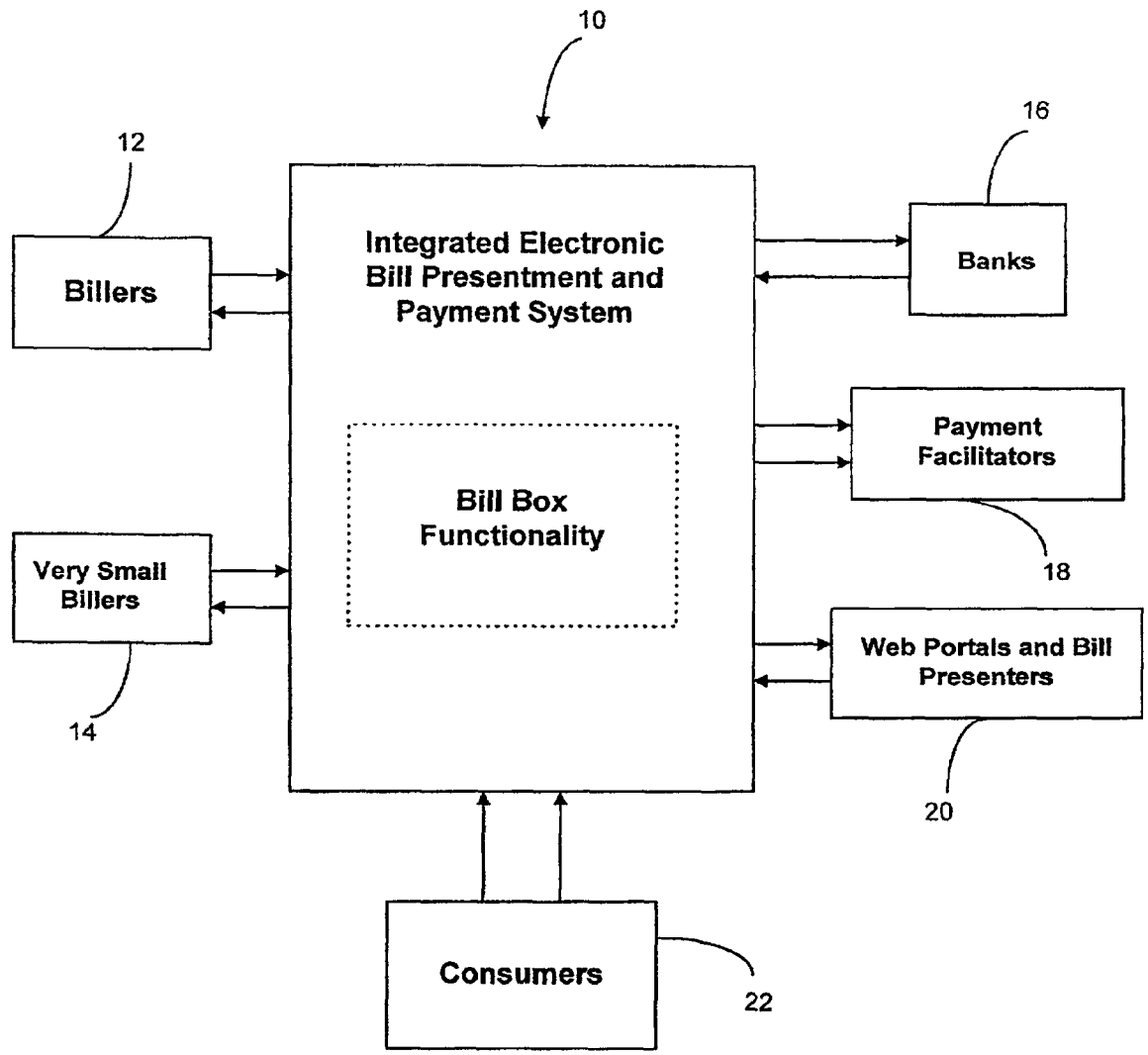
FIG. 1 is a block diagram showing external connectivity of a preferred embodiment of integrated electronic bill presentment and payment systems of the present invention.

FIG. 1 shows connectivity of a preferred embodiment 10 of integrated electronic bill presentment and payment systems ("systems") of the present invention. System embodiment 10 interfaces with, among other external entities, billers 12, which may include very small and non-recurrent billers 14, banks and other financial institutions 16, payment facilitators 18, web portals and bill presenters 20, and consumers 22. System embodiment 10 shown in FIG. 1 is implemented on a Sun platform using an Oracle database with other programs that allow connectivity via any desired network or transport infrastructure, preferably the Internet, to a portal interface in spaces 20 via an Extensible Markup Language or other standard markup or other common data interchange model or language. Portal interfaces 15 may be implemented in Hypertext Markup Language or as otherwise desired to operate on browsers, whether or not applet enabled, or as otherwise desired.

Figure 2:
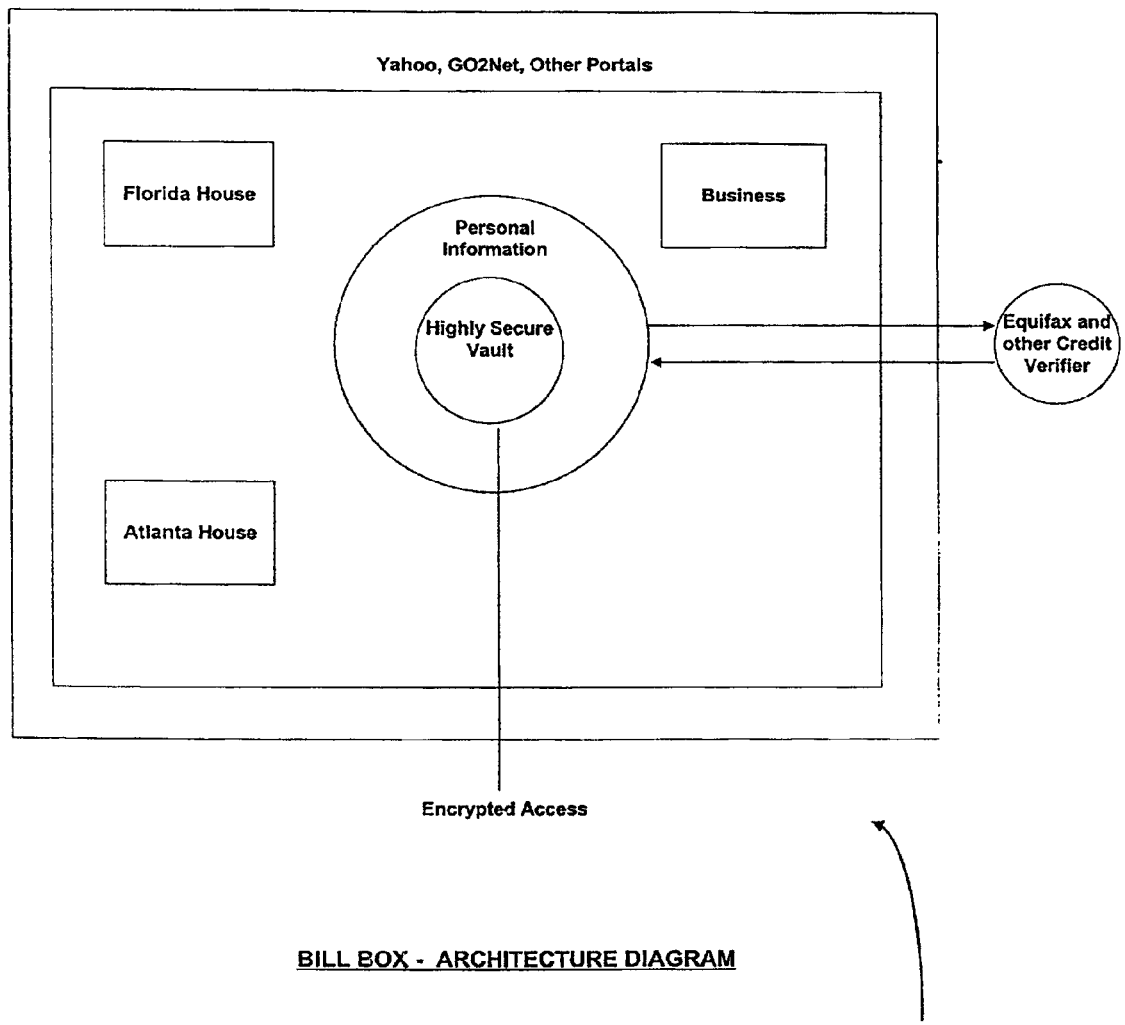
FIG. 2 is a block diagram illustrating the architecture of a preferred embodiment of integrated electronic bill presentment and payment systems of the present invention.

FIG. 2 shows an architecture diagram for a preferred embodiment 10 of systems according to the present invention. System embodiment 10 supports a portal interface 15 which allows consumers 22 and billers 12 and/or 14 the ability to self-enable EBPP by interacting with a series of web pages or other interfaces or presentations of whatever desired design or type on a web portal 20 or at any other location in actual, electronic or virtual space, supported by the global information infrastructure, successor systems, private systems or any other communications network or system. System embodiment 10 can enable all EBPP functionality via the portal interface 15. System embodiment 10 can control all interactions or transactions between billers 12 and/or 14 and consumers 22 using portal interface 15 as the communications and/or presentation medium. System embodiment 10 can also arrange all other necessary transactions with payment facilitators 18 and banks 16.

System embodiment 10 may be created to allow consumers 22 to define whatever portal or any other location or space they desire to access system embodiment 10. This can be any web portal 20 or other bill presentment web site, such as Yahoo.com® or GO2Net®. In order to initialize a bill portfolio, consumers 22 can go to the selected web portal or other space 20. System embodiment 10 prompts consumers 22 for personal information sufficient for authentication. System embodiment 10 can be adapted only to assign consumers 22 a secure bill portfolio when consumers 22 can be authenticated by a third party credit verifier service. After being verified, a consumer bill portfolio may be access controlled by any desirable schema or paradigm, including by using a bill portfolio identification number, a unique consumer identification number, and an encryption key defined by consumers 22. Consumers 22 may also define multiple accounts at the same bill portfolio.

Figure 3:
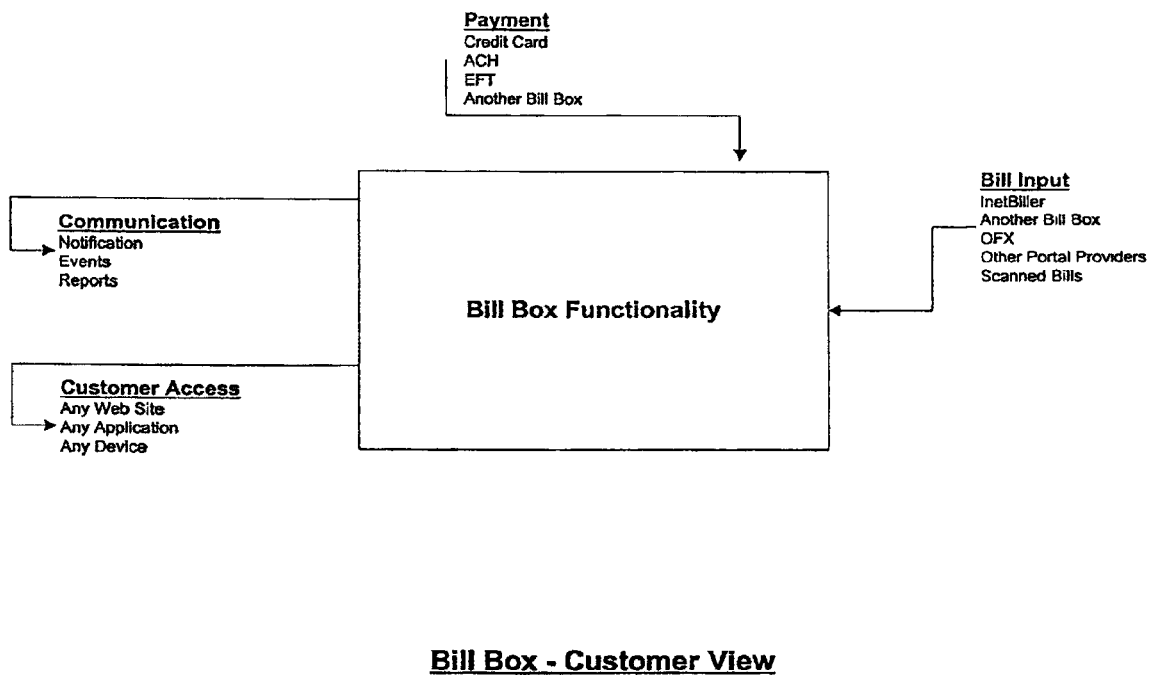
FIG. 3 is a block diagram illustrating general functionality of a customer-related portal interface supported by a preferred embodiment of integrated electronic bill presentment and payment systems of the present invention.

FIG. 3 illustrates the general functionality of a preferred embodiment of a consumer portal interface supported by system embodiment 10. System embodiment 10 provides consumers 22 a secure personalized portfolio for viewing and paying electronic bills that are input into system embodiment 10 by various billers. System embodiment 10 directs all incoming electronic bills to the bill portfolio of consumers 22. Consumers 22 also have the option of notifying paper-based billers that they desire to have bills presented electronically. System embodiment 10 can notify the billers and initiate electronic scanning of paper bills. Consumers 22 may access the portfolio at any location of choice using any interface, such as, for instance, a conventional web browser, other online device, any wireless device, or any other device which may communicate with system embodiment 10 in any manner. Any such device is a candidate to support presentation of or transaction with portal interface 15 by consumers 22. Consumers 22 can also define the format of the billing information. For example, the billing data may be supplied to consumers 22 in a variety of standard accounting formats.

System embodiment 10 also enables consumers 22 to pay electronic bills via credit card, ACH, or electronic funds transfer or using any other mode or medium of payment or reconciliation. System embodiment 10 can also support payments between different consumer bill portfolios. In addition, system embodiment 10 can provide for various types of communication between or among billers 12 and/or 14 and consumers 22 and between or among consumers 22.

Figure 4:
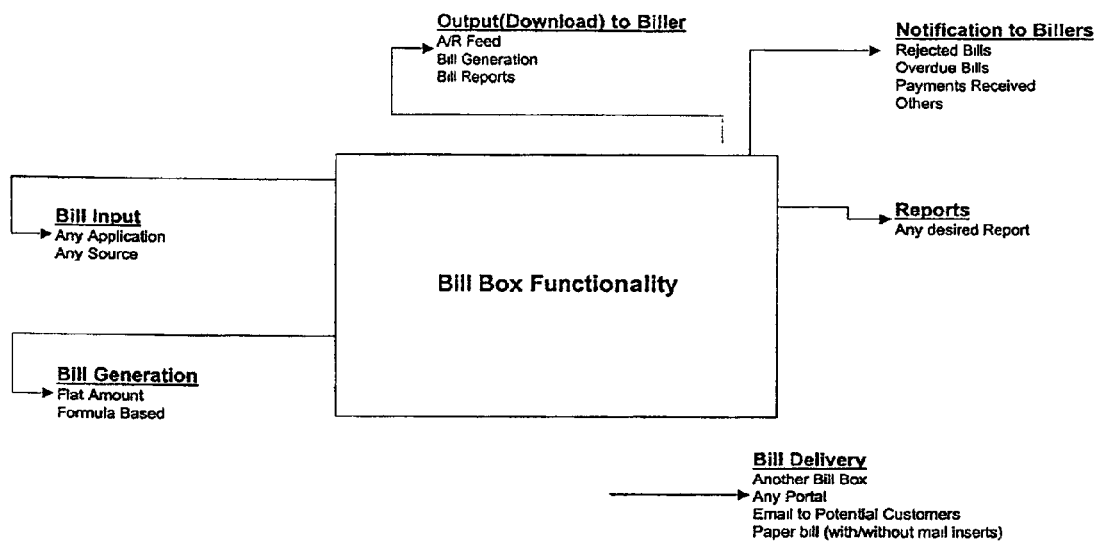
FIG. 4 is a block diagram illustrating general functionality of a biller-related portal interface supported by a preferred embodiment of integrated electronic bill presentment and payment systems of the present invention.

FIG. 4 illustrates the general functionality of a preferred embodiment of a biller interface in accordance with the present invention with system embodiment 10. Billers 12 and/or 14 may self-enable EBPP by accessing system embodiment 10. System embodiment 10 can obtain information from billers 12 and/or 14 and authenticate by a credit verifier service if desired. After a biller is authenticated, system embodiment 10 enables billers 12 and/or 14 to define the presentation of the bill, among other things. Billers 12 and/or 14 may also do such things as customize bill templates, upload logos, addresses, and define bill fields. System embodiment 10 may support billers 12 and/or 14 carrying out any desired or desirable task, such as specifying marketing messages that are defined by consumer specific rules, set up consumers 22 to bill and/or set up specialized consumer groups based on predefined rules.

Billers 12 and/or 14 can also specify various other bill generation criteria. The bill criteria can accommodate criteria such as whether the bill is for a fixed amount or whether it is formula based. Billers can also specify the bill schedule.

Billers 12 and/or 14 may bill consumers 22 by inputting any bill data. System embodiment 10 enables billers 12 and/or 14 to predefine how the electronic bill is to be displayed. System embodiment 10 also manages the routing of the bills. System embodiment 10 selects the biller-defined delivery channel, which could be either paper or electronic. If a bill portfolio exists, the bill is placed in it. If the billed consumer 22 does not have a bill portfolio, electronic deliveries can be sent via email along with a message notifying consumer 22 that the biller is using electronic billing. If neither exists, system embodiment 10 can perform standard paper billing. System embodiment 10 may also enable billers 12 and/or 14 to identify conventional mailing addresses for consumers 22 so that consumers 22 may enable standard paper billing. System embodiment 10 may also provide notification to billers 12 and/or 14 when bills are rejected, bills are overdue, or payments are received.

B. Consumer Interface to System

FIGS. 5-18 show web pages of a preferred embodiment of a consumer portal interface on a web portal 20 controlled by system embodiment 10. As mentioned above, the interface 15 can appear on any device in any location in actual, electronic or virtual space, using any network or communications system; use of the web and browser paradigm for the following description is merely one example and should not be interpreted to limit the invention or its scope in any way. That said, FIGS. 5 and 6 show web pages for the initial welcome screens for a web portal 20 of system embodiment 10. As any other web site or web portal 20 on the Internet, the welcome screen and all linked web pages on web portal 20 are freely accessible to billers 12 and/or 14 and consumers 22 using any standard web browsing software and computer. Consumers 22 may also access the web pages by using any device of whatever stripe, such as a personal digital assistant, a cellular phone, or pager, which supports Internet access via wireless technology, standard telephone dial-up or network connections, or any communications system.

The welcome screen permits new billers 12 and/or 14 and consumers 22 to create a new account. When setting up a new account, billers 12 and/or 14 and consumers 22 are required to input personal information that can be used to identify and authenticate the user for subsequent sessions. After the user inputs the personal information, the system can contact a credit verifier company, such as Equifax® or TRW®, and uses a credit report supplied by the company to automatically determine whether the user meets certain predetermined requirements, in which case a new account may be created.

After creating an account, the welcome screen permits new consumers 22 to create a new personalized bill portfolio or additional bill portfolios. Some sophisticated consumers 22 may desire to have separate bill portfolios within the same account for multiple homes, separate individuals within a home, or for a separate business. After a biller account is established, new billers 12 and/or 14 may access the biller functionality, which is discussed below.

The welcome screen also permits billers 12 and/or 14 and consumers 22 that have already registered to access system embodiment 10 by inputting a user identification number, a personalized password, and an encryption key. These user specific identifiers ensure that only registered users that have been authenticated are granted access to personal information stored on system embodiment 10.

Figure 8:
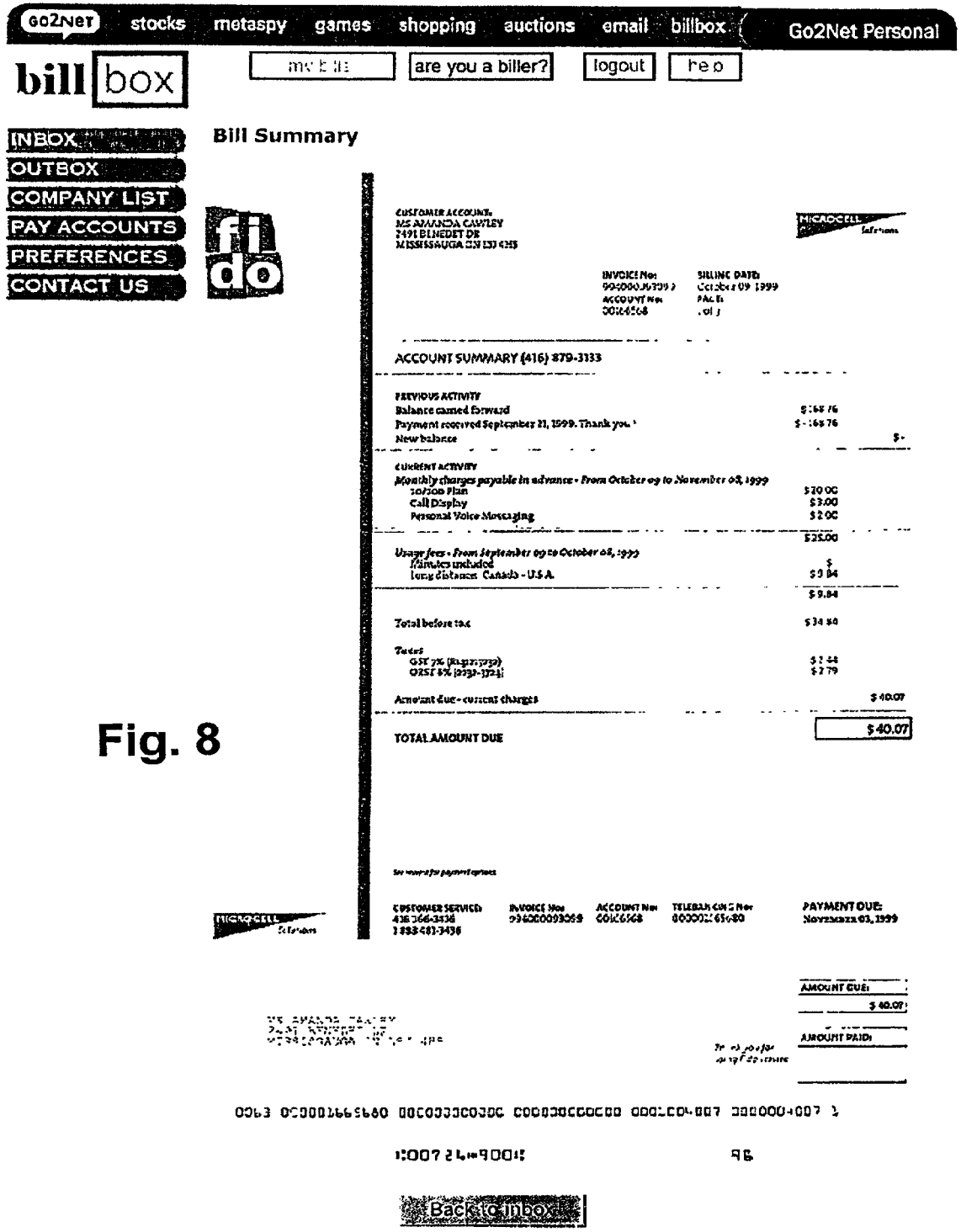
FIG. 8 is a bill summary list screenface of a portal interface generated by a preferred embodiment of systems of the present invention.

FIGS. 7-18 show a series of web pages for a personalized bill portfolio management system that registered consumers 22 use to access and interact with a bill portfolio via portal interface 15. FIG. 7 shows an incoming bill web page that enables consumers 22 to interact with all incoming electronic bills including electronic bills that have been received but remain unpaid and paper bills that have been received and scheduled for electronic presentment. For each bill, the web page displays the biller's name, the amount due, the date payment is due, and the status of the bill. Consumers 22 may also select and view each electronic bill. FIG. 8 shows a web page displaying a sample bill summary and payment information. The incoming bill web page also permits consumers 22 to select and electronically pay particular bills.

System embodiment 10 enables consumers 22 to notify paper billers that they desire to have bills presented electronically. System embodiment 10 can contact the paper-based biller and notify the biller that their electronic bills may be presented to consumers via system embodiment 10. If the biller declines, system embodiment 10 can arrange to have the paper bill scanned into system embodiment 10 where it can be viewed and paid by consumers 22 using system embodiment 10. Paper bills that have been received and are being processed for scanning and electronic presentment are displayed on the incoming bill web page as "scheduled". System embodiment 10 may also enable billers 12 and/or 14 to identify conventional mailing addresses for consumers 22 so that consumers 22 may enable standard paper billing.

FIG. 9 shows a biller list web page that enables consumers 22 to list the companies whose bills they desire to pay electronically. For each biller 12 and/or 14, the web page displays the company name, a corresponding identification number, and whether or not the company has been scheduled for electronic bill presentment and payment. Consumers 22 may also use the web page to modify the configuration for a biller 12 and/or 14 or to delete a biller 12 and/or 14 from the list altogether. FIG. 10 shows a web page that enables consumers 22 to add additional billers 12 and/or 14 for electronic bill presentment and payment. The web page has a series of pull down menus enabling a consumer 22 to define a biller configuration. One menu allows the consumer 22 to define a particular category for the biller 12 and/or 14. For example, consumers 22 may categorize billers 12 and/or 14 as a utility biller, telecommunications service biller, credit card biller, professional services biller, or any other category of relevance to the consumer. Another menu allows the consumer 22 to select a bill delivery method such as CheckFree® or any other third party electronic payment facilitator 18. Other menus permit the consumer 22 to input the account number for the biller 12 and/or 14, as well as an expiration date. Consumers 22 may also elect to enable functionality permitting a recurring payment schedule.

FIG. 11 shows an outgoing bill web page that enables consumers 22 to interact with electronic bills that have already been paid. Similar to the incoming bill web page, the outgoing bill web page displays the biller's name, the amount due, the date payment is due, and whether or not the bill has been paid. Consumers 22 may also select and view a bill summary and payment information screen for a particular bill. Finally, consumers 22 may select and delete bills that have already been paid.

FIG. 12 shows a payment accounts web page that enables a consumer 22 to view, add, modify, and delete credit card or debit card accounts that the consumer 22 desires to use for electronic payment of bills. For each payment account the consumer 22 is required to input an account type, an account number, an account name, expiration date, and the name appearing on the card.

Figure 13:
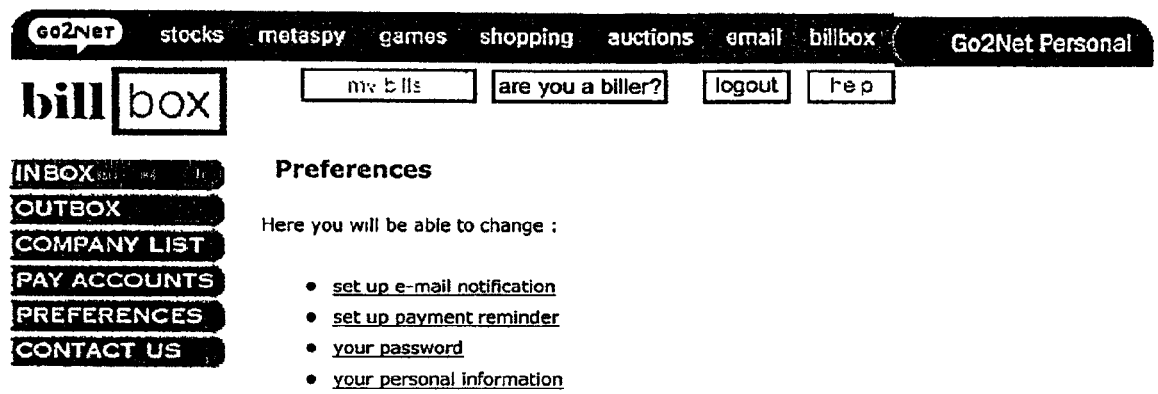
FIG. 13 is a preferences screenface of a portal interface generated by a preferred embodiment of systems of the present invention.

FIG. 13 shows a consumer preferences web page that enables the consumer 22 to personalize a bill portfolio. FIGS. 14 and 15 show web pages that enable consumers 22 to view and modify personal information associated with a bill portfolio and a personalized password for accessing a bill portfolio. The web page also enables consumers 22 to initialize email notification of when bills are presented to a bill portfolio for payment. Consumers 22 may also create generic reminders or bill payment reminders, which may be sent directly to an email address.

Figure 16:
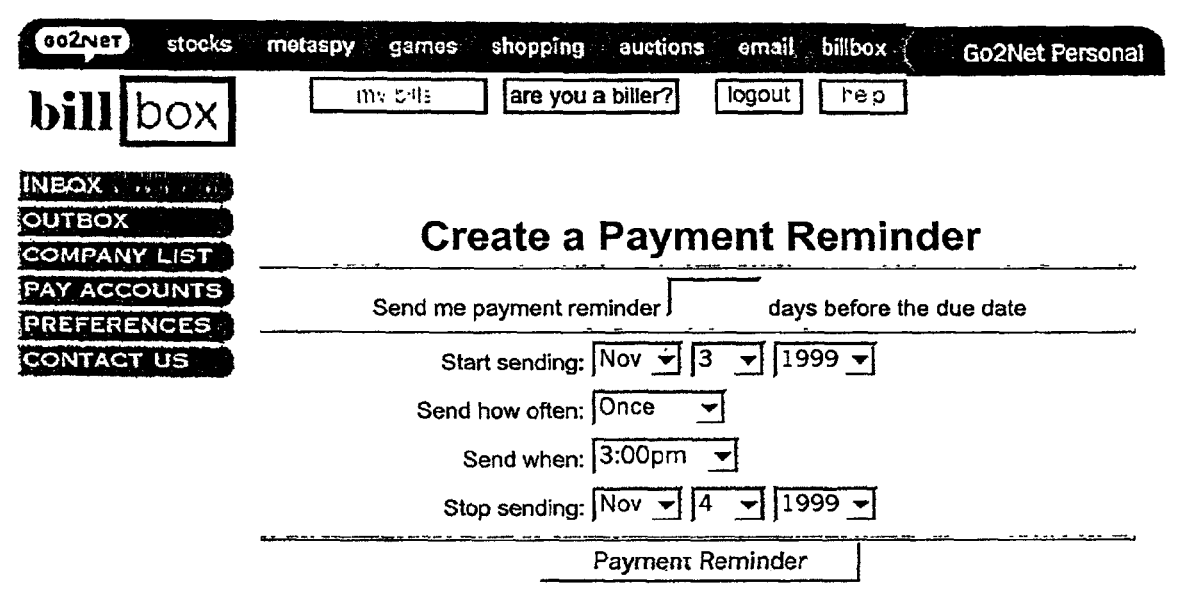
Figure 17:
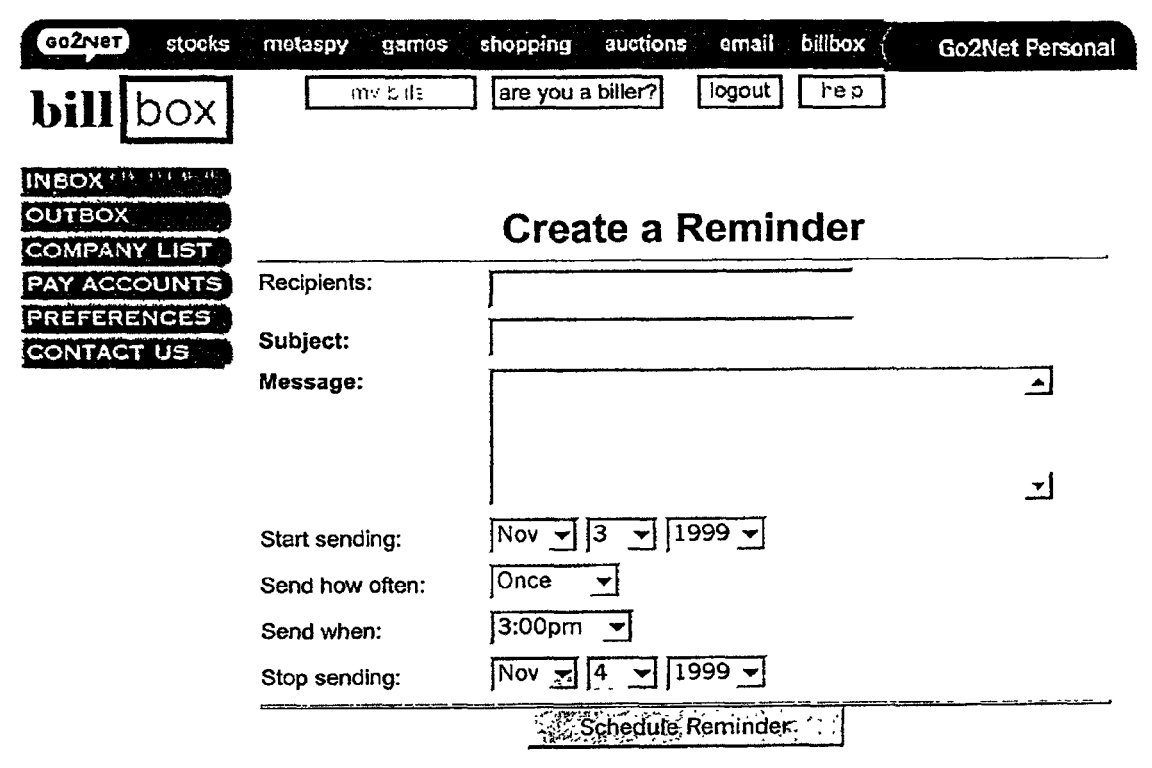

FIGS. 16 and 17 show web pages for creating and scheduling generic reminders and payment reminders. The web pages enable consumers 22 to specify when the reminder will begin to be sent, how often the reminder will be sent, at what time the reminder will be sent, and when to stop sending the reminder. For generic reminders, the consumer 22, can be required to specify recipients of the reminder and the content of the message.

At any time while logged into system embodiment 10 and accessing a bill portfolio, consumers 22 may contact consumer service by using a consumer service web page as shown in FIG. 18. The consumer service web page also lists a variety of contact information, as well as links to answers to frequently asked questions.

The pages described above and shown in FIGS. 5-18 are merely exemplary. In a first sense, each or any of them may contain additional fields, or may contain fewer fields, to solicit or require information of any type or sort, or to allow consumers 22 to interact with system embodiment 10 in any way for the purpose or result of bill payment or reconciliation. In a second sense, other pages may be employed for such results or purposes, or any of the above-mentioned pages may be omitted. Again, these pages are merely one example of an embodiment of a portal interface that can support system embodiment 10 on any platform or device anywhere in actual, electronic or virtual space.

C. Biller Interface to System

FIGS. 19-33 show a series of web pages that billers 12 and/or 14 may use to self-enable EBPP. (As mentioned above, the interface 15 can appear on any device in any location in actual, electronic or virtual space, using any network or communications system; use of the web and browser paradigm for the following description is merely one example and should not be interpreted to limit the invention or its scope in any way.) Any type of biller 12 and/or 14 may use system embodiment 10 to self-enable EBPP, but it is particularly advantageous to billers 14 with a relatively small number of consumers, as well as billers 14 with non-recurring consumers. FIG. 19 shows a registration web page for signing up to use system embodiment 10 for EBPP. Billers 12 and/or 14 can enter a series of information text boxes on the web page, which include a merchant identification number. System embodiment 10 can then contact a credit verifier and access a credit report supplied by the credit verifier to automatically determine whether the biller 12 and/or 14 is authenticated. If the biller 12 and/or 14 is authenticated, system embodiment 10 automatically notifies the biller 12 and/or 14 and access to system embodiment 10 is granted.

Figure 20:
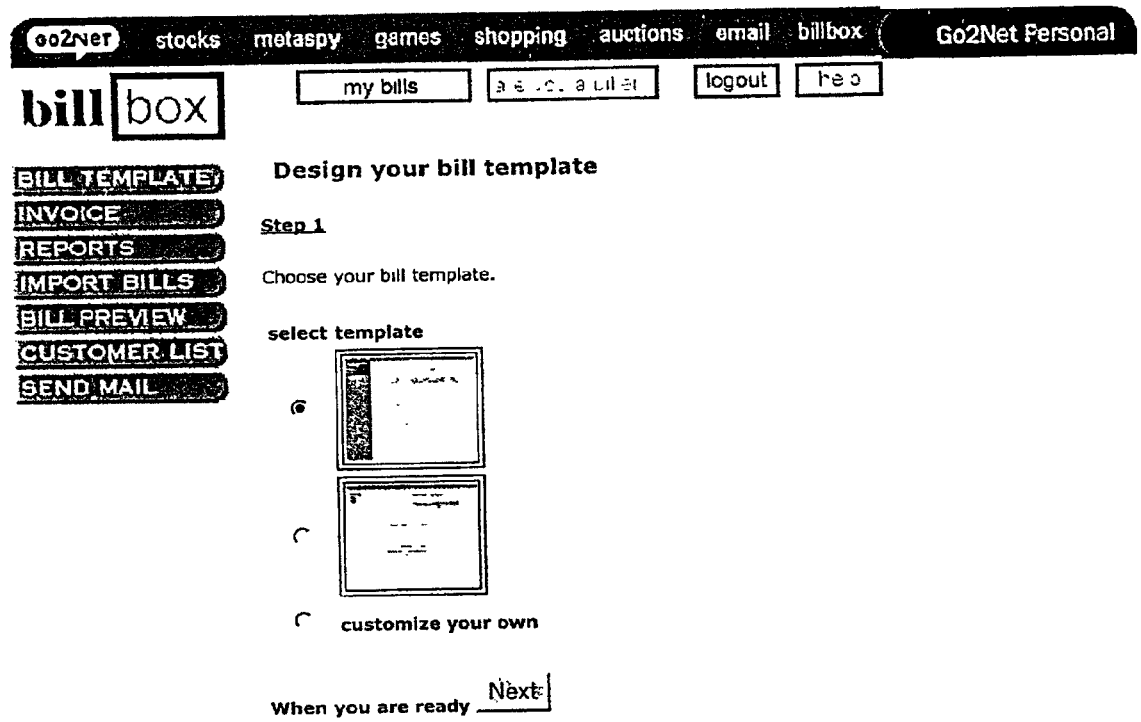
FIG. 20 is a bill template design step 1 screenface of a portal interface generated by a preferred embodiment of systems of the present invention.
Figure 21:
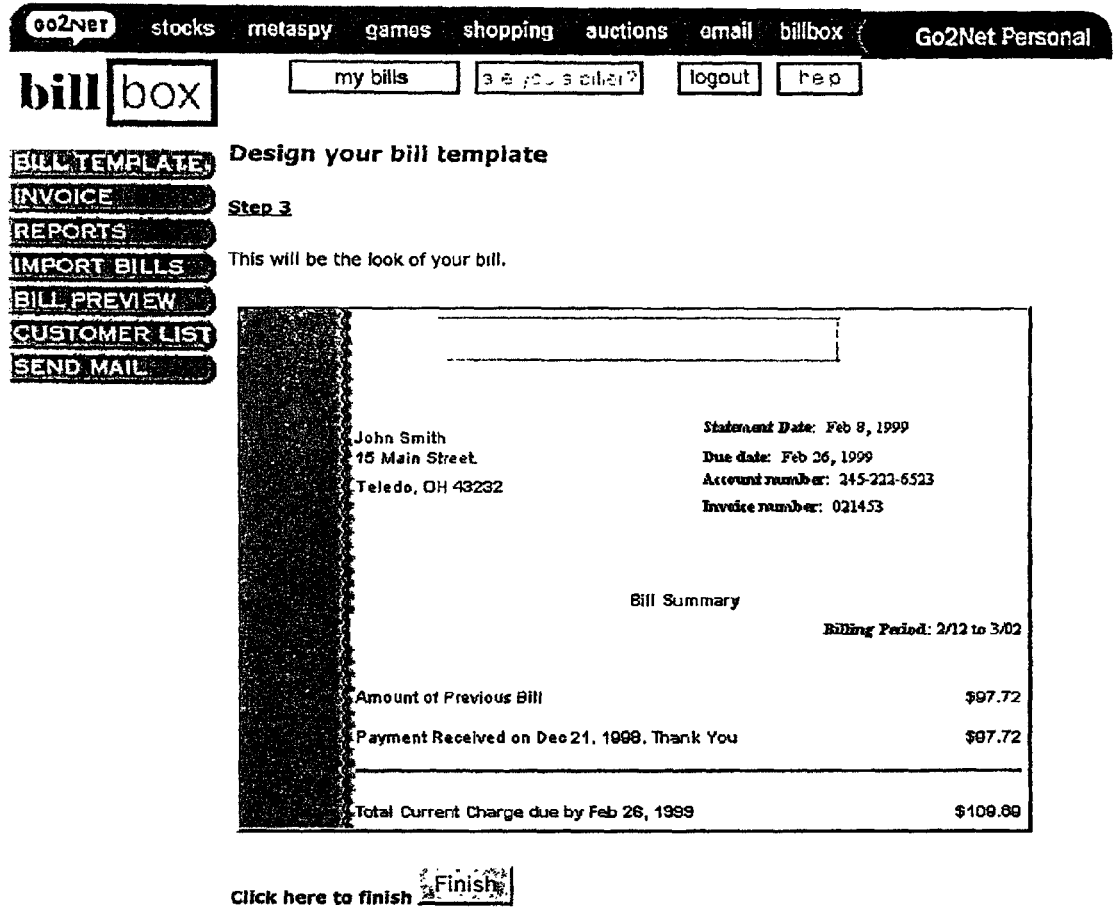
FIG. 21 is a bill template design step 3 screenface of a portal interface generated by a preferred embodiment of systems of the present invention.
Figure 22:
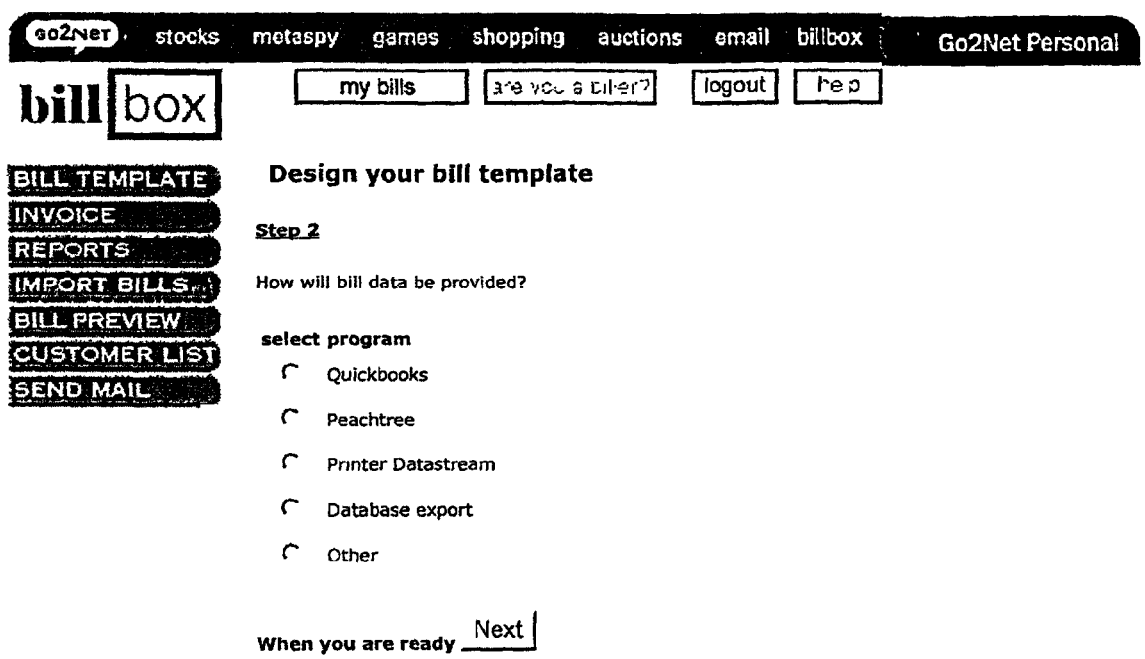
FIG. 22 is a bill template design step 2 screenface of a portal interface generated by a preferred embodiment of systems of the present invention.

As described above, once registered and authenticated billers 12 and/or 14 may access system embodiment 10 by inputting a user identification number, a personalized password, and an encryption key. FIGS. 20-22 show web pages that enable billers 12 and/or 14 to define the layout of an electronic bill. FIG. 20 shows a web page for choosing a predefined template provided by system embodiment 10. FIG. 21 shows a web page that enables billers 12 and/or 14 to interactively design their own bill template. Once the layout of the bill is defined, billers 12 and/or 14 can specify what type of software program they will use to provide consumer billing data to system embodiment 10. In the preferred embodiment of the invention, system embodiment 10 supports billing data of any type, such as, for example, data formatted to comply with over the counter software accounting packages such as QuickBooks® and Peachtree®, or billing data formatted as a printer datastream or a database export. FIG. 22 shows a web page for billers 12 and/or 14 to select the appropriate billing data format.

Figure 25:
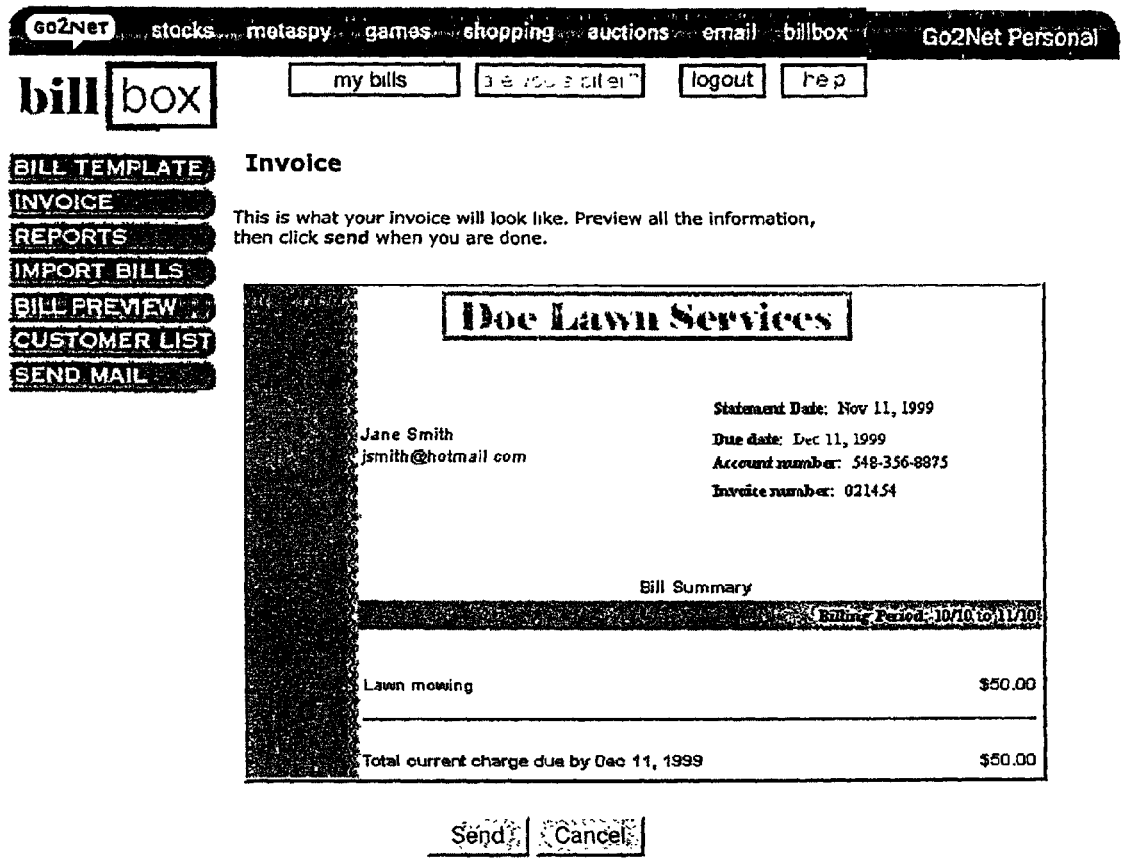
FIG. 25 is an invoice preview screenface of a portal interface generated by a preferred embodiment of systems of the present invention.

In situations where creating a bill template is not manageable, as for one time transactions with a consumer 22, system embodiment 10 can enable billers 12 and/or 14 to send a one time only invoice. FIGS. 23-25 show web pages that enable this functionality. Billers 12 and/or 14 can be required to include the biller's name, the amount due, a description of the goods or services, the recipient of the invoice, the number of the bill portfolio where the invoice is to be sent, and the date payment is due. After inputting the required invoice information, system embodiment 10 preferably permits the biller 12 and/or 14 to preview the invoice as it will appear in the consumer's bill portfolio and send it.

Figure 26:
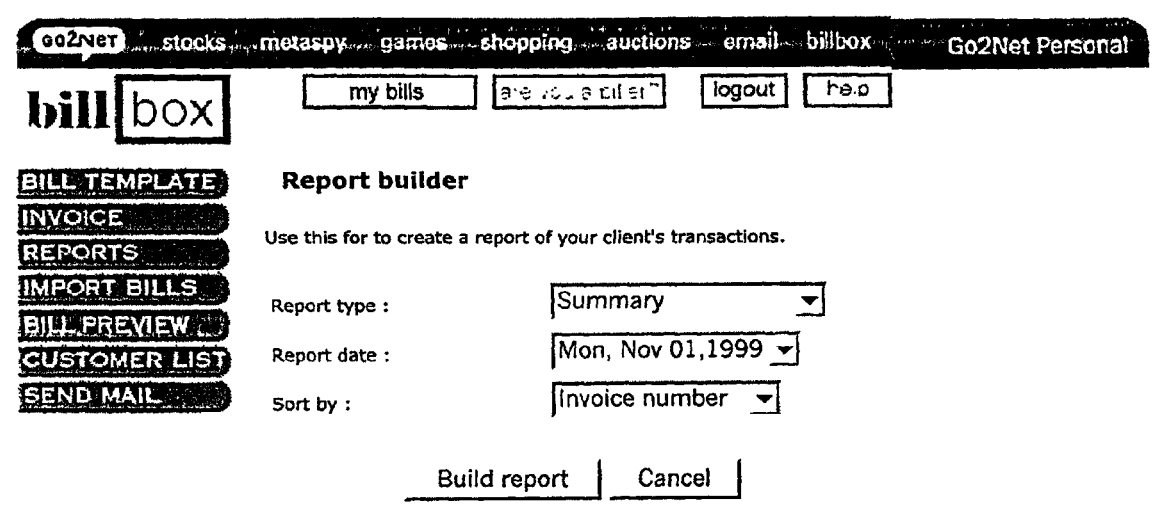
Figure 27:
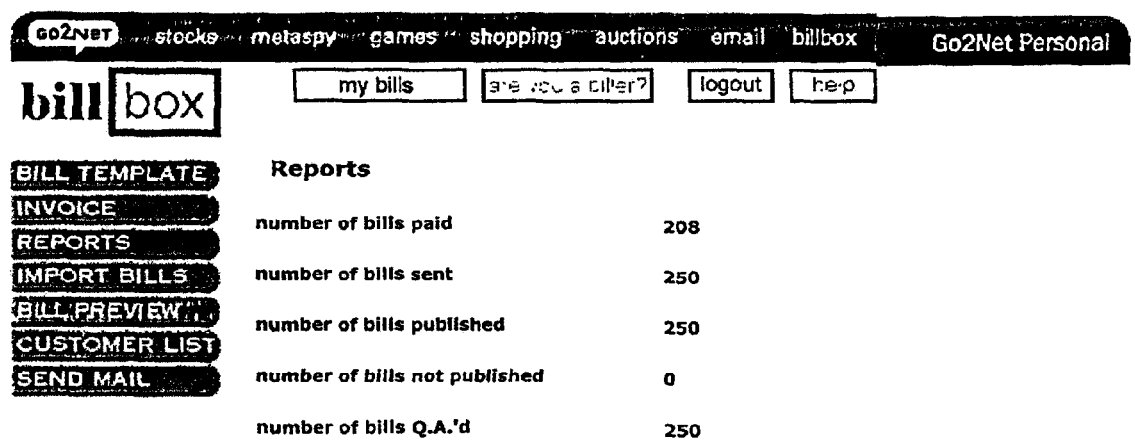
FIG. 27 is a reports screenface of a portal interface generated by a preferred embodiment of systems of the present invention.

System embodiment 10 can also enable billers 12 and/or 14 to create various reports. Billers 12 and/or 14 may create reports showing any of a number of transactional statistics, such as the number of bills paid, the number of bills sent, the number of bills disputed, the number of bills partially paid, the number of bills published, the number of bills not published, and/or the number of bills that have been reviewed for quality assurance. FIGS. 26 and 27 show web pages enabling billers 12 and/or 14 to create and schedule reports.

Figure 28:
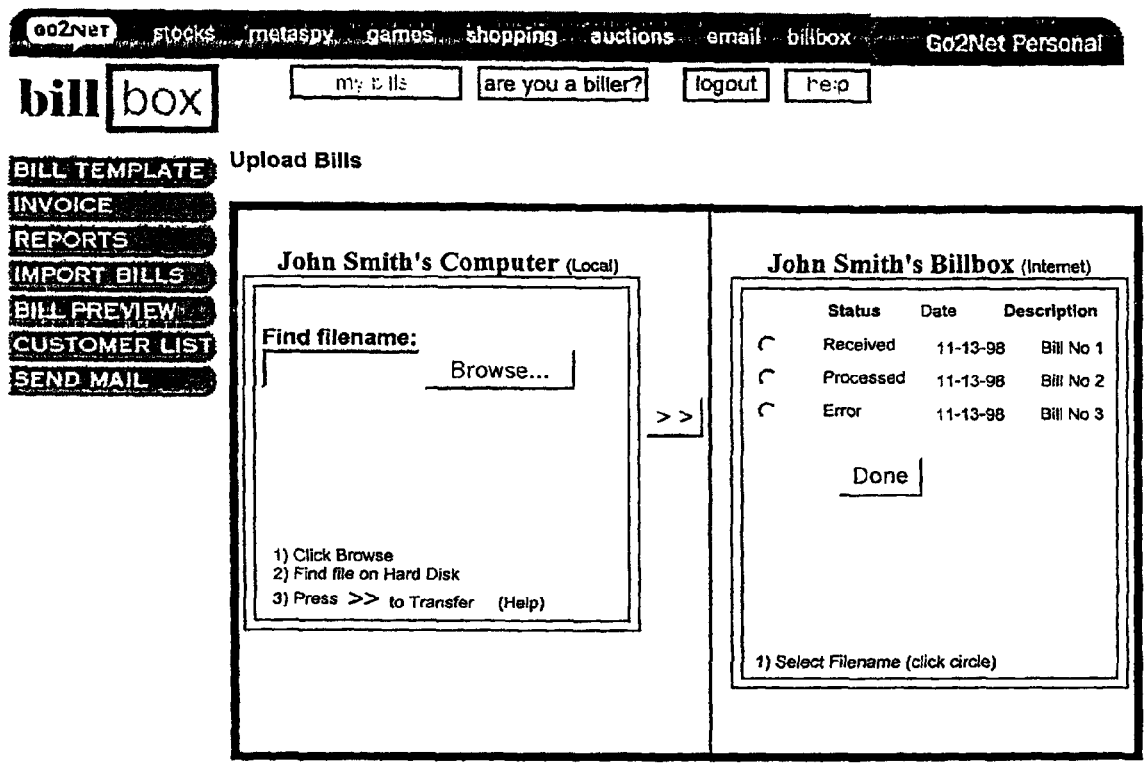
FIG. 28 is an upload bills screenface of a portal interface generated by a preferred embodiment of systems of the present invention.
Figure 29:
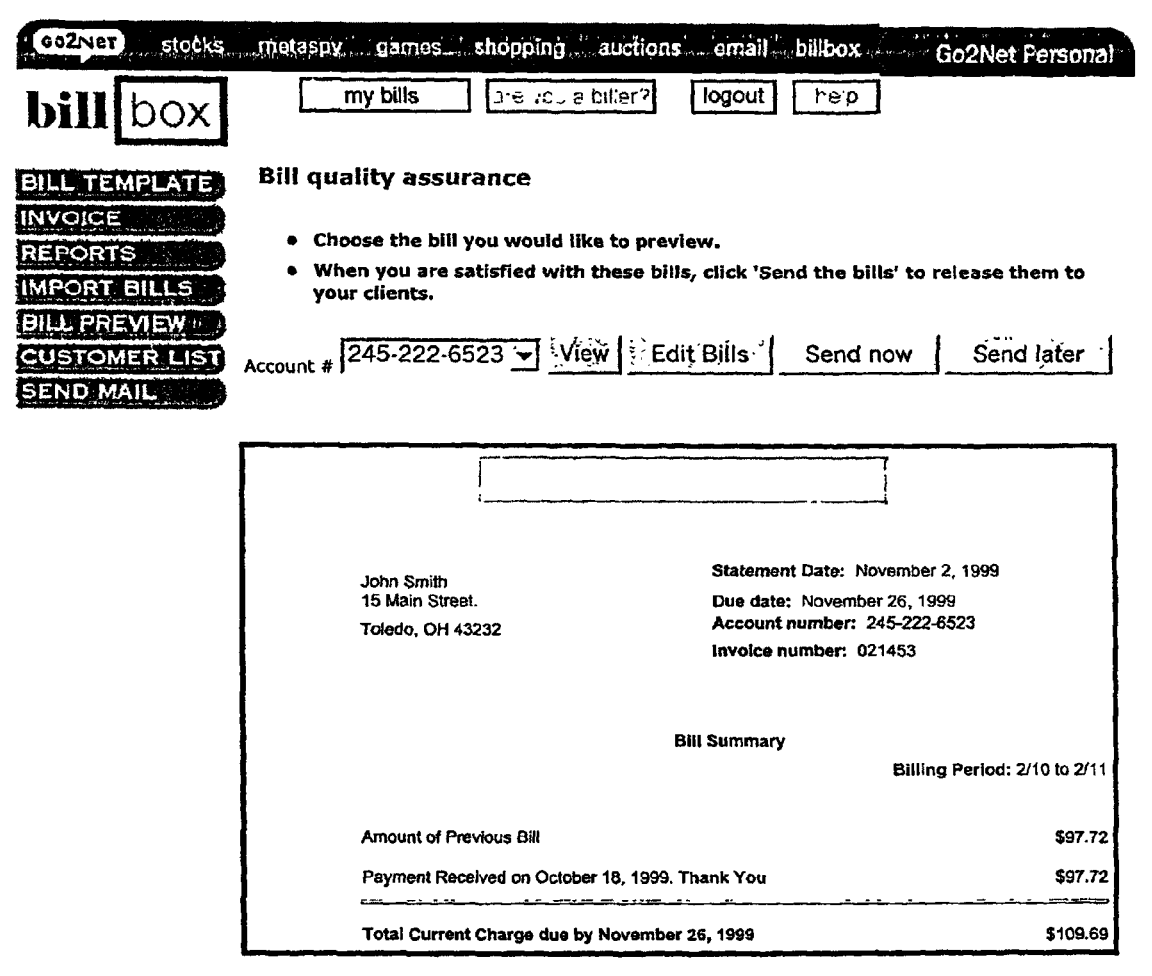

System embodiment 10 can also enable billers 12 and/or 14 to upload bills from a consumer's bill portfolio. FIG. 28 shows a web page that enables billers 12 and/or 14 to do this. Billers 12 and/or 14 may search for a particular consumer 22 by name or may sort for a number of consumers 22 in a predefined group. System embodiment 10 performs the requested query and then displays each of the bills in the consumer's bill portfolio that are associated with the biller. Billers 12 and/or 14 may also select and preview a particular bill. FIG. 29 shows a web page for previewing the bill of consumers 22. From the preview screen, billers 12 and/or 14 may edit the bill, send the bill, or defer sending the bill until later. FIG. 30 shows a web page that enables a biller 12 and/or 14 to edit a consumer's bill.

Figure 32:
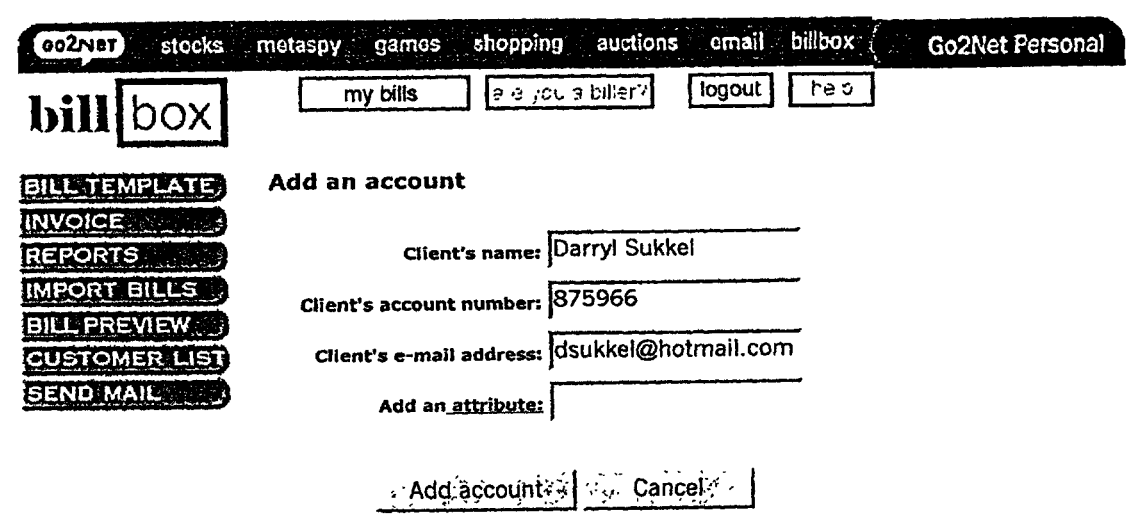

As shown in FIG. 31, system embodiment 10 can also enable billers 12 and/or 14 to add, modify, or delete consumer accounts. Billers 12 and/or 14 may add a consumer account or choose the account organizer by selecting the appropriate link on the web page. FIG. 32 shows the linked web page where a biller 12 and/or 14 may input a new client's name, account number, email address, and attribute. System embodiment 10 may also enable billers 12 and/or 14 to identify conventional mailing addresses for consumers 22 so that consumers 22 may enable standard paper billing. The attribute field can be used in combination with the account organizer to define groups of consumer accounts to simplify bill generation and delivery. Billers 12 and/or 14 may use consumer groups to define and generate bills without the need for repetition. For example, when creating a list of consumer accounts, a biller 12 and/or 14 may assign a specific zip code attribute to a group of accounts, which would enable the biller 12 and/or 14 to generate and deliver all bills of the specific zip code at the same time.

Figure 33:
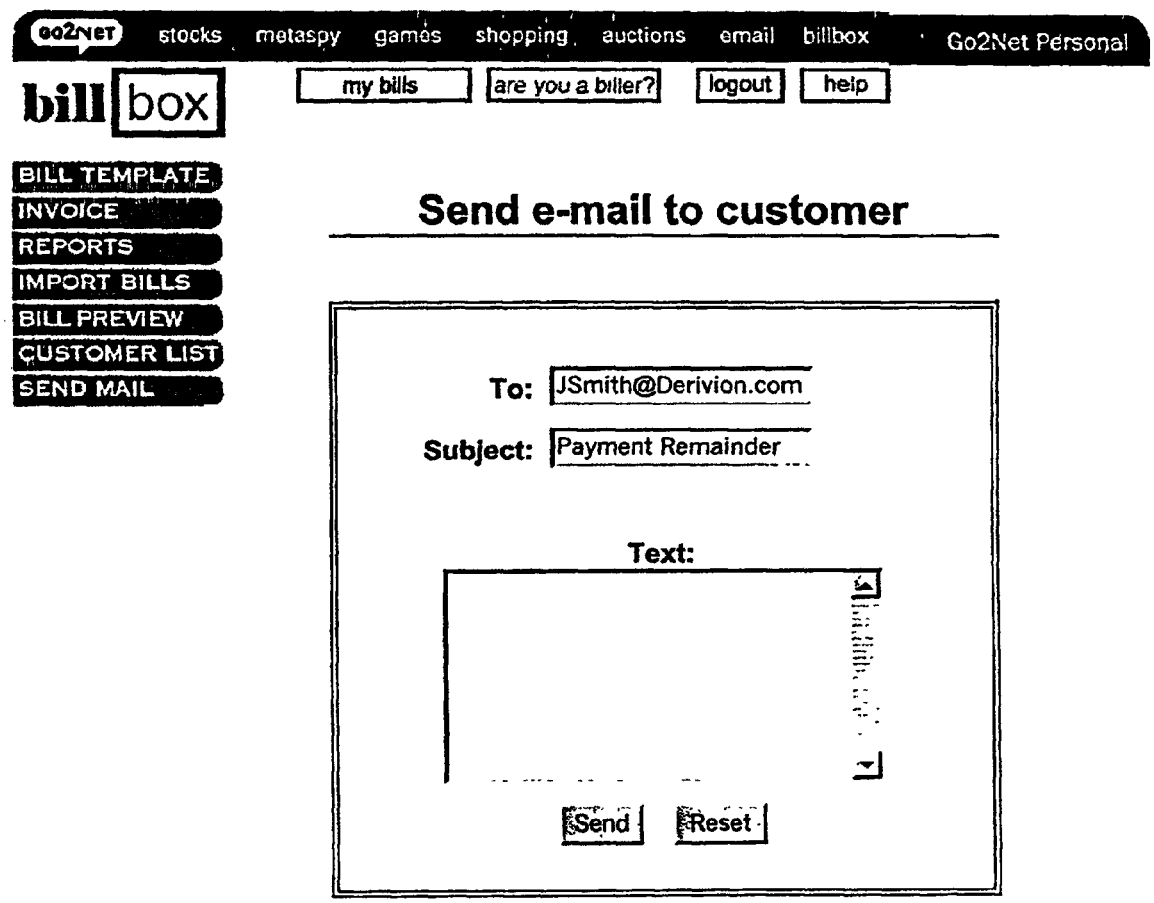
FIG. 33 is a send customer e-mail screenface of a portal interface generated by a preferred embodiment of systems of the present invention.

As shown in FIG. 33, at any time while logged into system embodiment 10 billers 12 and/or 14 may send emails to a consumer's bill portfolio. Billers 12 and/or 14 can use this functionality for payment reminders, marketing notices and offers, or any other advantageous use.

The pages described above and shown in FIGS. 19-33 are merely exemplary. In a first sense, each or any of them may contain additional fields, or may contain fewer fields, to solicit or require information of any type or sort, or to allow billers 12 and/or 14 to interact with system embodiment 10 in any way for the purpose or result of bill presentment or to effectuate payment or reconciliation. In a second sense, other pages may be employed for such results or purposes, or any of the above-mentioned pages may be omitted. Again, these pages are merely one example of an embodiment of a portal interface that can support system embodiment 10 on any platform or device anywhere in actual, electronic or virtual space.

The foregoing is provided for purposes of disclosure of a preferred embodiment of the present invention. Additions to, deletions or omissions from, or changes to interfaces, systems, or embodiments disclosed above may be accomplished; so long as they help carry out the results or purposes of providing systems that support interfaces to effectuate EBPP, they remain within the scope or spirit of the invention.

The invention claimed is:

1. A method, comprising:
receiving, via a bill data processor, bill data relating to a plurality of bills from a plurality of billers, the bills being associated with a plurality of consumers having consumer terminals;
converting, via the bill data processor, the bill data into a format compatible with a database; and
storing, via the bill data processor, the converted bill data in the database;
authenticating, via a bill report processor, merchant identification numbers received from billers;
upon authentication, providing, via the bill report processor, a report to a biller, the report including data relating to a status of bills corresponding to the bill data stored in the database;
granting access, via a bill security processor, to the database upon receipt of encrypted access information; and
in response to instructions received from a selected one of the consumer terminals, creating, via a portal interface implemented on a platform separate from the consumer terminals and configured by instructions received from the consumer terminals, at least two bill portfolios for the selected one of the consumer terminals, the two portfolios corresponding to different aspects of a financial profile of a consumer associated with the selected one of the consumer terminals;

upon receipt of a request from the selected one of the consumer terminals, transmitting, via the portal interface, signals to the selected one of the consumer terminals to cause display of an electronic bill representing a selected bill;

upon receipt of instructions from the selected one of the consumer terminals, initiating, via the portal interface, payment of the selected bill; and updating, via the portal interface, information in the database with payments information.

2. The method of claim 1, further comprising, in response to instructions received from the selected one of the consumer terminals, displaying, via the portal interface, a plurality of visual interfaces associated with billers in one of the portfolios.

3. The method of claim 1, wherein the different aspects include one or more residences, one or more individuals, one or more businesses, or a combination thereof.

4. The method of claim 1, further comprising transferring, via a bill payment processor, billing information between a plurality of financial institutions and the database.

5. The method of claim 1, further comprising transferring, via a bill payment processor, payment information between a plurality of payment facilitators and the database.

6. The method of claim 1, wherein the credit verifier is a third party credit verifier.

7. The method of claim 1, wherein the portal interface is HTML-compatible.

8. The method of claim 1, wherein the portal interface is XML-compatible.

9. The method of claim 6, further comprising authorizing, via the credit verifier, access to the database by a consumer during a session on a visual interface.

10. A method comprising:
receiving, via a bill data processor coupled to a database storing data relating to a plurality of bills from a plurality of billers, the bills being associated with a plurality of consumers having consumer terminals, bill data relating to the plurality of bills;

converting, via the bill data processor, the bill data into a format compatible with the database;

authenticating, via a bill report processor coupled to the database, merchant identification numbers received from billers;

upon authentication, providing, via the bill report processor, a report to a biller, the report including data relating to a status of bills corresponding to the bill data stored in the database;

requiring, via a bill security element, encrypted access information before allowing access to the database;

communicating, via a bill payment processor, between the financial institutions and the database regarding bill payment; and in response to signals received from a selected one of the consumer terminals, prompting, via a portal interface implemented by at least one processor, a consumer associated with the selected one of the consumer terminals, via a visual interface, for logon information;

receiving, via the portal interface, the logon information;

initiating, via the portal interface and using the logon information, an interactive session via the bill security element with a credit verifier and query the credit verifier for database authorization for the consumer associated with the selected one of the consumer terminals;

if authorization is received, allowing, via the portal interface, the consumer associated with the selected one of the consumer terminals to access the database;

in response to instructions received from the selected one of the consumer terminals, creating, via the portal interface, at least two bill portfolios for the consumer associated with the selected one of the consumer terminals, the two portfolios corresponding to different aspects of a financial profile of the consumer associated with the selected one of the consumer terminals;

upon receipt of a request from the selected one of the consumer terminals, transmitting, via the portal interface, signals to the selected one of the consumer terminals to cause display of an electronic bill representing one of the plurality of bills from a biller in one of the portfolios;

upon receipt of instructions from the selected one of the consumer terminals, initiating, via the portal interface, payment of the bill represented by the electronic bill; and in response to instructions received from the selected one of the consumer terminals, displaying, via the portal interface, a plurality of visual interfaces associated with a web portal or bill presentment and payment website, the visual interfaces being associated with different web portals or bill presentment and payment websites from a biller in one of the portfolios.

11. The method of claim 10, wherein the different aspects include one or more residences, one or more individuals, one or more businesses, or a combination thereof.

12. The method of claim 10, further comprising receiving, via the portal interface, a selection from the consumer associated with the selected one of the consumer terminals of one of the visual interfaces to receive and pay bills.

13. The method of claim 10, further comprising accessing, via the portal interface, a website associated with a visual interface to present a bill to the consumer and pay the bill.

14. The method of claim 10, further comprising receiving, via the portal interface, a consumer inquiry to a biller about the status of a bill using the bill report processor with a visual interface on a website.

15. The method of claim 14, further comprising establishing, via a bill data processor, an interactive session between the consumer associated with the selected one of the consumer terminals and a biller.

16. The method of claim 10, further comprising paying bills with a credit card via the bill payment processor.

17. The method of claim 10, further comprising reporting to a consumer terminal reports from the system via the bill report processor.

18. The method of claim 10, further comprising notifying a biller when a consumer has paid a bill via the bill report processor.

19. The method of claim 10, further comprising modifying, via the bill data processor, a format in which a bill is presented to the selected one of the consumer terminals on the visual interface according to specifications from a biller.

20. The method of claim 10, further comprising modifying a format in which a bill is presented to the selected one of the consumer terminals according to specifications from the consumer associated with the selected one of the consumer terminals.

21. The method of claim 10, further comprising selecting for review, via the bill report processor, bills coming due on a certain date.

22. The method of claim 10, further comprising selecting bills, via the bill report processor, that are overdue for review.

23. The method of claim 10, further comprising paying bills, via the portal interface, for a consumer from a plurality of different visual interfaces.

* * * * *

UNITED STATES PATENT AND TRADEMARK OFFICE
CERTIFICATE OF CORRECTION

PATENT NO. : 8,533,079 B2
APPLICATION NO. : 13/107766
DATED : September 10, 2013
INVENTOR(S) : Dushyant Sharma Page 1 of 1

It is certified that error appears in the above-identified patent and that said Letters Patent is hereby corrected as shown below:

Title page,
Item [60] should be added to read:

--Provisional application No. 60/175,753, filed on January 12, 2000.--

In the Specification,
Column 1,
Lines 4-6, please replace:

"This is a continuation of application Ser. No. 09/751,265, filed Dec. 29, 2000 now U.S. Pat. No. 7,945,491, which is incorporated herein by reference."

with

--This is a continuation of application Ser. No. 09/751,265, filed Dec. 29, 2000 now U.S. Pat. No. 7,945,491, which is incorporated herein by reference. This application also claims the benefit under 35 U.S.C. § 119(e) of U.S. Provisional Patent Application No. 60/175,753, filed January 12, 2000.--

Signed and Sealed this
Sixteenth Day of June, 2015

Michelle K. Lee
*Director of the United States Patent and Trademark Office*